(12) United States Patent
Scofield

(10) Patent No.: US 11,516,954 B2
(45) Date of Patent: Dec. 6, 2022

(54) PIVOTING SHOVEL ASSEMBLY

(71) Applicant: Michael Scofield, Malta, NY (US)

(72) Inventor: Michael Scofield, Malta, NY (US)

( * ) Notice: Subject to any disclaimer, the term of this patent is extended or adjusted under 35 U.S.C. 154(b) by 507 days.

(21) Appl. No.: 16/721,080

(22) Filed: Dec. 19, 2019

(65) Prior Publication Data
US 2021/0185871 A1   Jun. 24, 2021

(51) Int. Cl.
*A01B 1/02* (2006.01)
*E01H 5/02* (2006.01)

(52) U.S. Cl.
CPC .............. *A01B 1/028* (2013.01); *A01B 1/026* (2013.01); *E01H 5/02* (2013.01)

(58) Field of Classification Search
CPC ........... A01B 1/028; A01B 1/026; A01B 1/20; A01D 7/10; E01H 5/02
USPC .......................................... 294/51, 50.8, 50.9
See application file for complete search history.

(56) References Cited

U.S. PATENT DOCUMENTS

| | | | | |
|---|---|---|---|---|
| 4,037,397 A | * | 7/1977 | Fiorentino | A01D 7/10 294/50.8 |
| 4,057,277 A | * | 11/1977 | Burkholder | A01B 1/18 294/50.8 |
| 4,103,954 A | | 1/1978 | Vaslas | |
| D275,928 S | | 10/1984 | LoPresti | |
| 4,881,332 A | | 11/1989 | Evertsen | |
| 4,991,386 A | * | 2/1991 | Dirksen | A01D 7/00 294/50.8 |
| 5,564,267 A | * | 10/1996 | Bricker | A01D 7/10 294/50.8 |
| D384,865 S | * | 10/1997 | Baran | D30/162 |
| 7,661,258 B1 | * | 2/2010 | Petruzelli | A01D 7/10 56/400.12 |
| 7,681,932 B2 | | 3/2010 | Chang | |
| 8,985,655 B2 | * | 3/2015 | Kavanagh | B25B 7/00 294/50.8 |
| 9,469,952 B2 | | 10/2016 | Quinn | |
| 11,236,478 B2 | * | 2/2022 | Avila | B25J 18/025 |
| 2006/0214443 A1 | | 9/2006 | Dixon | |
| 2012/0025551 A1 | | 2/2012 | Janosky | |

FOREIGN PATENT DOCUMENTS

CA         2568693        5/2007

\* cited by examiner

*Primary Examiner* — Paul T Chin

(57) ABSTRACT

A pivoting shovel assembly for reducing the effort required to lift and empty a shovel includes a tool. The tool includes a shaft. A first handle is attached to and extends upwardly away from the shaft. A head is attached to and extends downwardly away from the shaft opposite the first handle. A pole has an upper end and a lower end with a foot attached to the lower end. A coupler is attached to and extends between the pole and the shaft such that the pole and the shaft are pivotable with respect to each other. The coupler allows pivoting wherein upper halves of the pole and the shaft are positionable in a first position orientated parallel to each other and in a second position wherein the first handle is pivoted rearwardly with respect to the upper end.

9 Claims, 5 Drawing Sheets form the subject matter of the claims appended hereto.

PIVOTING SHOVEL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to shovel leverage devices and more particularly pertains to a new shovel leverage device for reducing the effort required to lift and empty a shovel. The disclosure uses a second pivoting post to support and provide leverage to lift and unload the shovel.

(2) Description of Related Art Including Information Disclosed Under 37 CFR 1.97 and 1.98

The prior art relates to shovel leverage devices.

BRIEF SUMMARY OF THE INVENTION

An embodiment of the disclosure meets the needs presented above by generally comprising a tool. The tool includes a shaft. The shaft has a first end, a second end and a perimeter edge extending between the first end and the second end. A first handle is attached to and extends upwardly away from the first end. A head is attached to and extends downwardly away from the second end. A pole is included. The pole has an upper end and a lower end. A foot is attached to the lower end. A coupler is attached to and extends between the pole and the shaft such that the pole and the shaft are pivotable with respect to each other. The coupler allows pivoting wherein upper halves of the pole and the shaft are positionable in a first position orientated parallel to each other and in a second position wherein the first handle is pivoted rearwardly with respect to the upper end.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
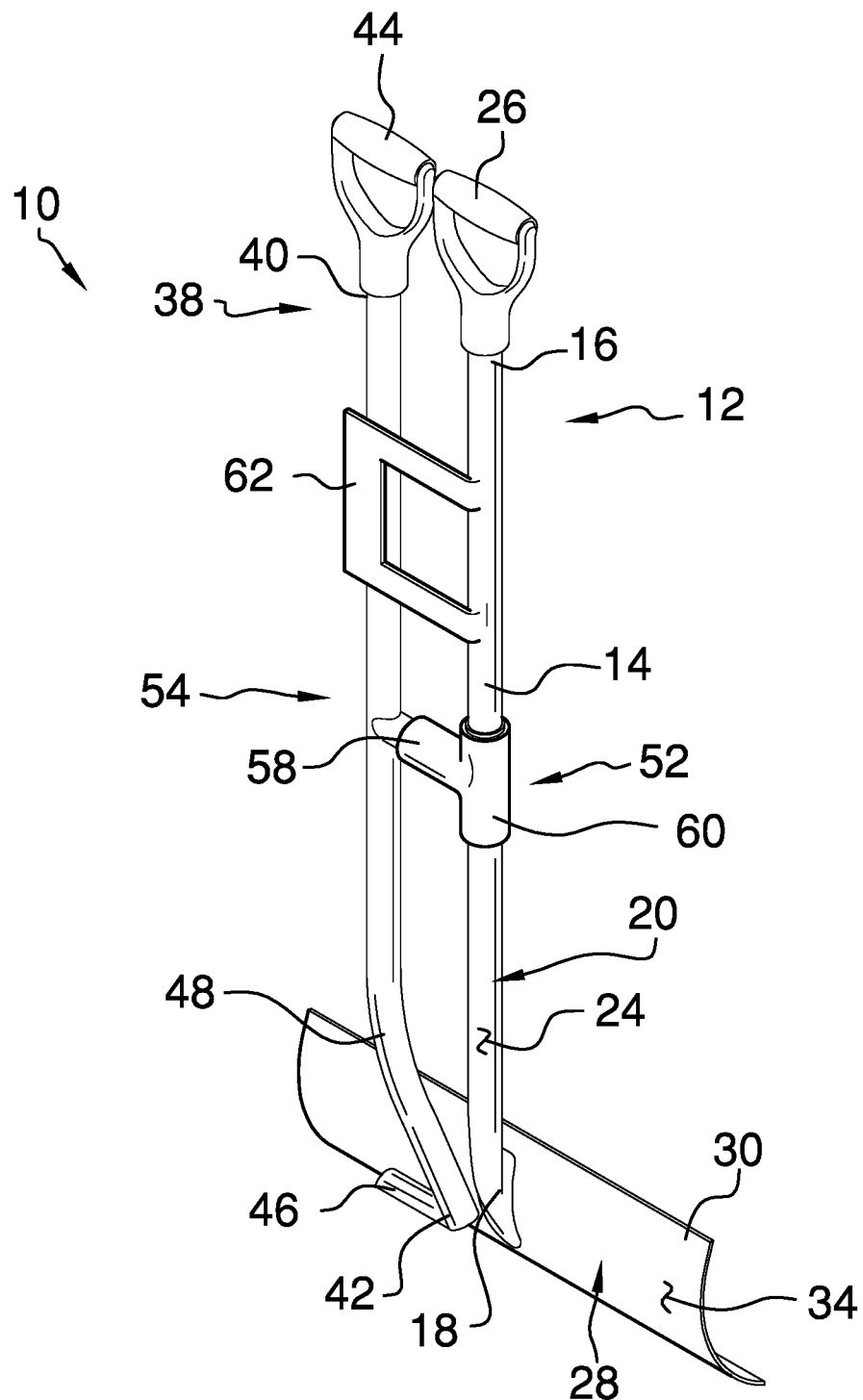
FIG. 1 is a rear isometric view of a pivoting shovel assembly according to an embodiment of the disclosure.
Figure 2:
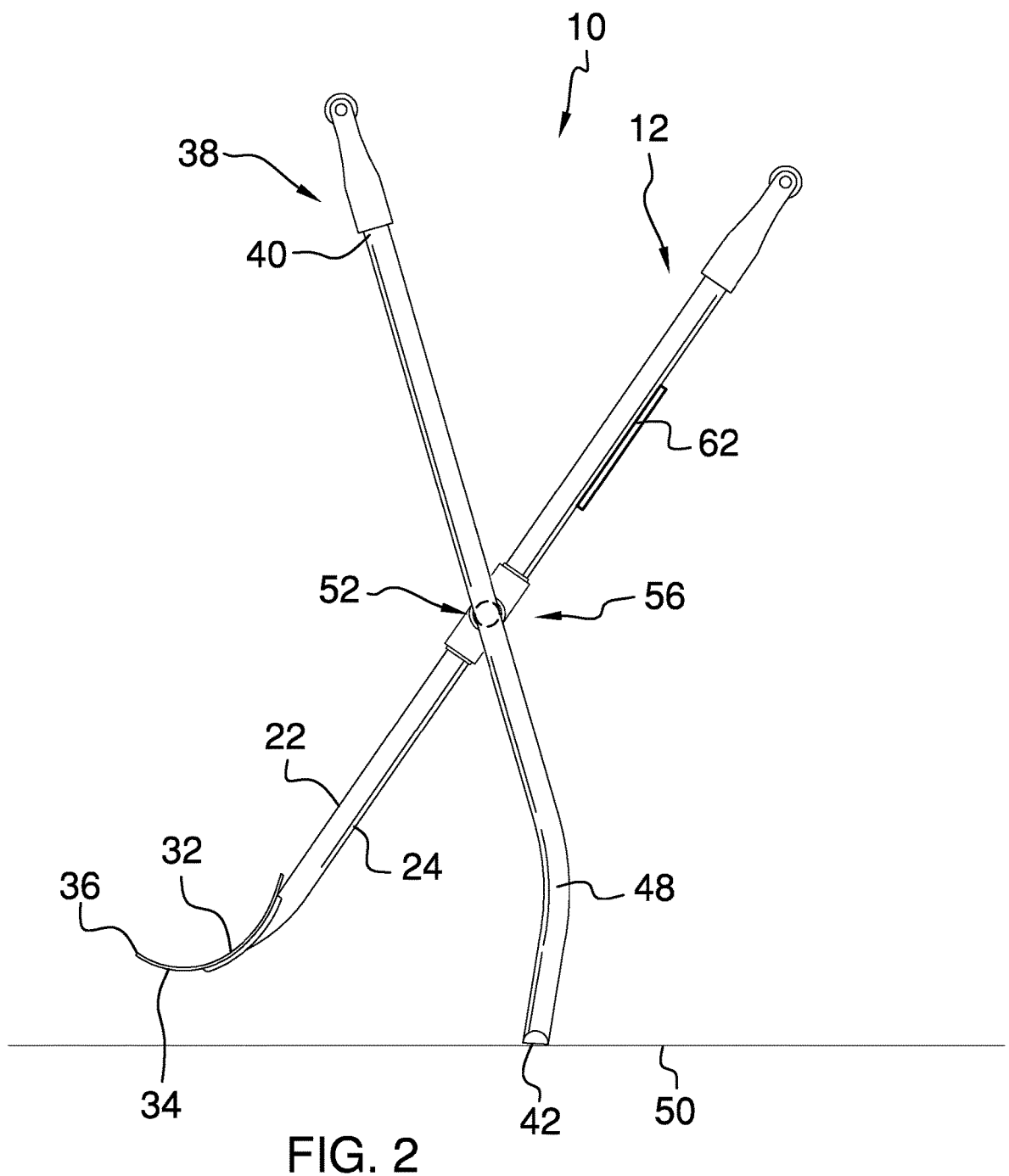
FIG. 2 is a side in-use view of an embodiment of the disclosure.
Figure 3:
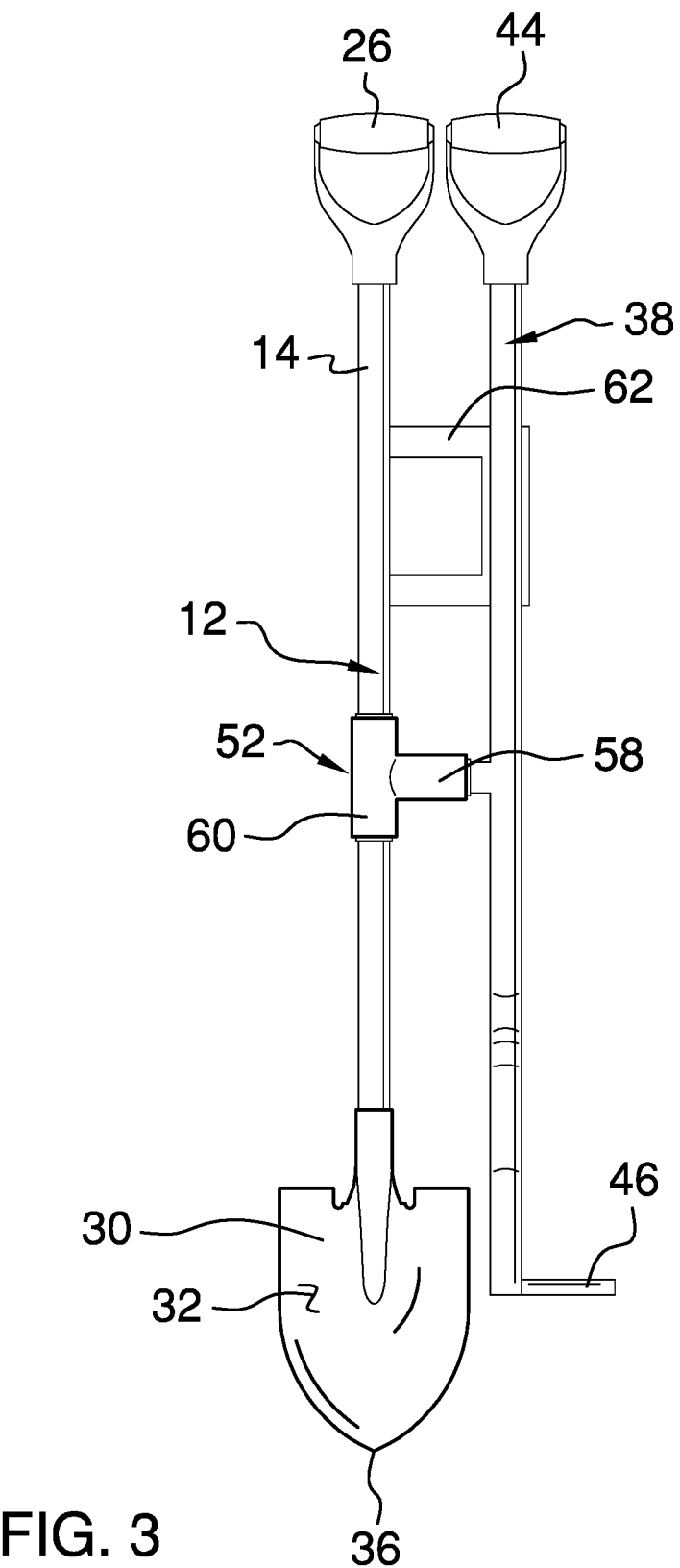
FIG. 3 is a front view of an embodiment of the disclosure.
Figure 4:
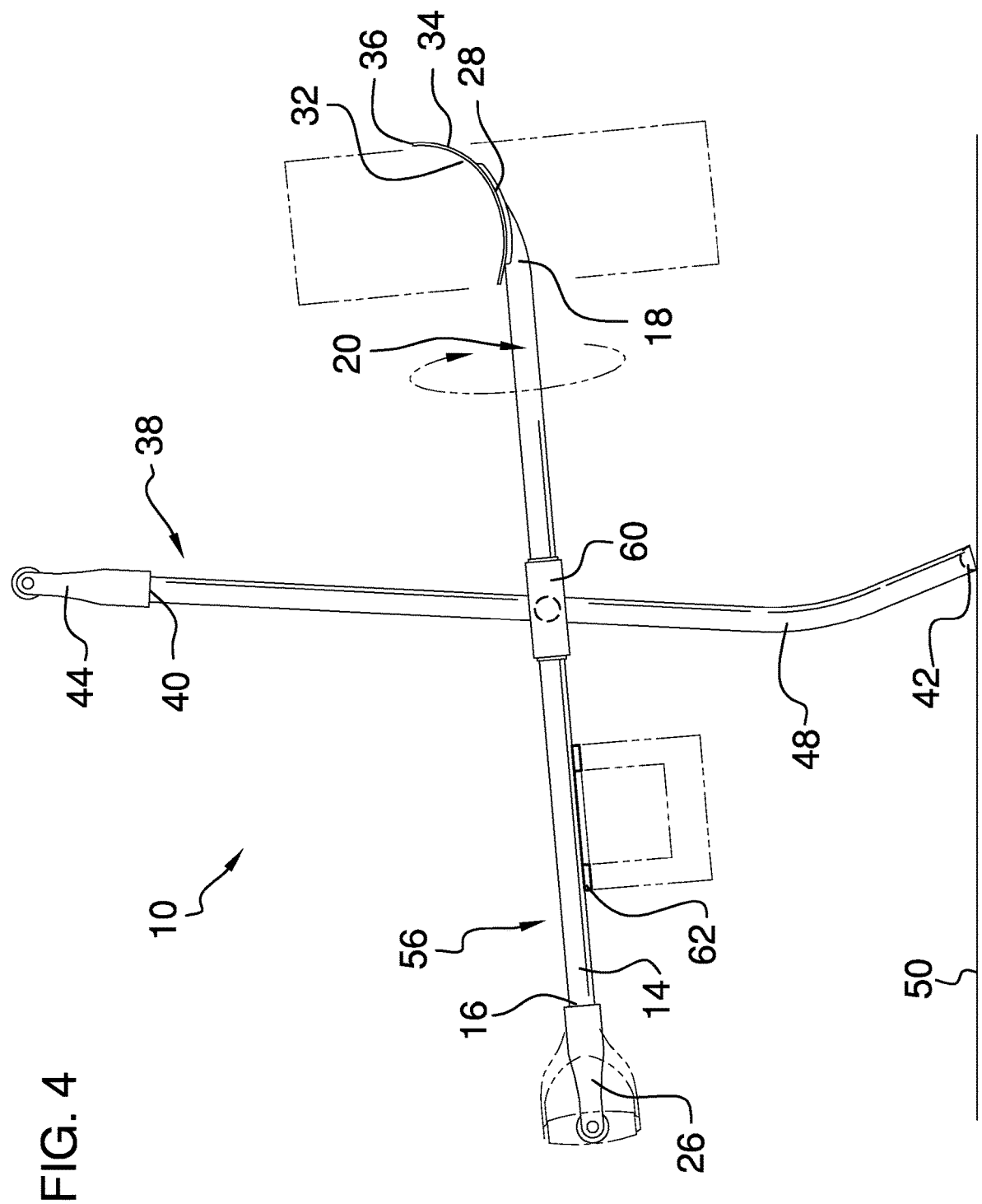
FIG. 4 is a side in-use view of an embodiment of the disclosure further illustrating the unloading motion.
Figure 5:
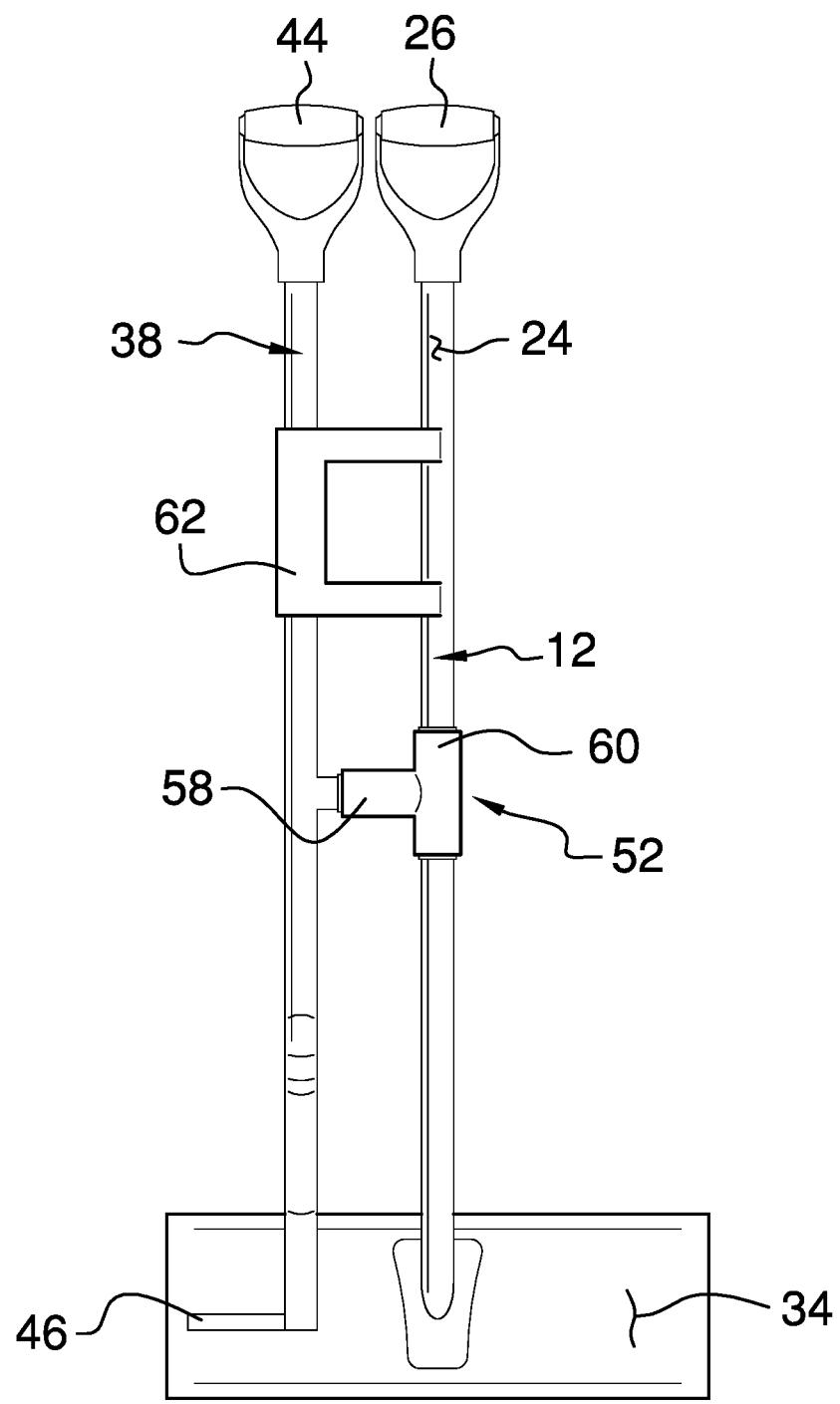
FIG. 5 is a rear view of an embodiment of the disclosure.

With reference now to the drawings, and in particular to FIGS. 1 through 5 thereof, a new shovel leverage device embodying the principles and concepts of an embodiment of the disclosure and generally designated by the reference numeral 10 will be described.

As best illustrated in FIGS. 1 through 5, the pivoting shovel assembly 10 generally comprises a tool 12. The tool 12 includes a shaft 14. The shaft 14 has a first end 16, a second end 18 and a perimeter edge 20 extending between the first end 16 and the second end 18. The perimeter edge 20 has a front side 22 and a rear side 24. A first handle 26 is attached to and extends upwardly away from the first end 16. A head 28 is attached to and extends downwardly away from the second end 18. The head 28 has a blade 30. The blade 30 includes a front face 32, a rear face 34 and a bottom edge 36 wherein the front face 32 faces a same direction as the front side 22 of the shaft 14. The head 28 may include alternative embodiments for specific tasks. Alternative embodiments may include shovels for snow, shovels for dirt, tined tools such as pitchforks, and other conventional tools where an operator is scooping and lifting a load.

A pole 38 has an upper end 40 and a lower end 42. A second handle 44 is attached to the upper end 40. A foot 46 is attached to the lower end 42. The pole 38 has a bend 48 therein positioned nearer the lower end 42 than the upper end 40 such that the pole 38 is angled in a forward direction from the bend 48 to the lower end 42. The foot 46 is sized to engage with a person's foot such that the pole 38 can be held stationary between the person's foot and a surface 50.

A coupler 52 is attached to and extends between the pole 38 and the shaft 14 such that the pole 38 and the shaft 14 are pivotable with respect to each other. The coupler 52 allows pivoting wherein upper halves of the pole 38 and the shaft 14 are positionable in a first position 54 orientated parallel to each other and in a second position 56 wherein the first handle 26 is pivoted rearwardly with respect to the second handle 44. The first handle 26 and the second handle 44 are aligned laterally with each other when in the first position

54. The foot 46 is above a horizontal plane of the bottom edge 36 when the shaft 14 and the pole 38 are in the first position 54. The foot 46 extends laterally away from the shaft 14. The pole 38 supports both the tool 12 and the load when in the second position 56. The coupler 52 includes an axle 58 extending between the pole 38 and the shaft 14. The axle 58 is spaced from each of the upper end 40 and the lower end 42. The coupler 52 further includes a sleeve 60 which is positioned on the shaft 14. The shaft 14 is rotatable within the sleeve 60. The axle 58 is engaged with the sleeve 60. The sleeve 60 may allow the shaft 14 to slide within the sleeve 60 to aid in use. The shaft 14 is rotatable within the sleeve 60 to allow the tool 12 to be rotated to dump the load that was scooped or picked up using the head 28 of the tool 12.

A stop 62 is attached to the shaft 14. The stop 62 inhibits pivoting of the shaft 14 with respect to the pole 38 when the stop 62 abuts the pole 38. The stop 62 abuts the pole 38 when the shaft 14 and pole 38 are in the first position 54 and the front face 32 is directed forward.

In use, the tool 12 is used with the head 28 engaging with the load on the surface 50. The foot 46 is engaged with the surface 50 and the tool 12 is pivoted to the second position 56 such that the head 28 is lifted above a dumping location of the surface 50. The shaft 14 is rotated within the sleeve 60 to unload the load onto the dumping location of the surface 50. The shaft 14 is rotated back with the head 28 facing forward and pivoted back to the first position 5.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pivotable shovel assembly being comprising:
   a tool comprising:
      a shaft having a first end, a second end and a perimeter edge extending between said first end and said second end;
      a first handle being attached to and extending upwardly away from said first end;
      a head being attached to and extending downwardly away from said second end;
   a pole having an upper end and a lower end, a foot being attached to said lower end;
   a coupler being attached to and extending between said pole and said shaft such that said pole and said shaft are pivotable with respect to each other wherein upper halves of said pole and said shaft are positionable in a first position orientated parallel to each other and in a second position wherein said first handle is pivoted rearwardly with respect to said upper end; and
   wherein a stop is attached to said shaft, said stop inhibiting pivoting of said shaft with respect to said pole when said stop abuts said pole.

2. The pivotable shovel assembly according to claim 1, wherein said perimeter edge has a front side and a rear side.

3. The pivotable shovel assembly according to claim 2, wherein said head comprises a blade including a front face, a rear face and a bottom edge, said front face facing a same direction as said front side of said shaft.

4. A pivotable shovel assembly being comprising:
   a tool comprising:
      a shaft having a first end, a second end and a perimeter edge extending between said first end and said second end;
      a first handle being attached to and extending upwardly away from said first end;
      a head being attached to and extending downwardly away from said second end;
   a pole having an upper end and a lower end, a foot being attached to said lower end;
   a coupler being attached to and extending between said pole and said shaft such that said pole and said shaft are pivotable with respect to each other wherein upper halves of said pole and said shaft are positionable in a first position orientated parallel to each other and in a second position wherein said first handle is pivoted rearwardly with respect to said upper end; and
   wherein said pole has a bend therein positioned nearer said lower end than said upper end such that said pole is angled in a forward direction from said bend to said lower end.

5. A pivotable shovel assembly being comprising:
   a tool comprising:
      a shaft having a first end, a second end and a perimeter edge extending between said first end and said second end;
      a first handle being attached to and extending upwardly away from said first end;
      a head being attached to and extending downwardly away from said second end;
   a pole having an upper end and a lower end, a foot being attached to said lower end;
   a coupler being attached to and extending between said pole and said shaft such that said pole and said shaft are pivotable with respect to each other wherein upper halves of said pole and said shaft are positionable in a first position orientated parallel to each other and in a second position wherein said first handle is pivoted rearwardly with respect to said upper end; and
   wherein said first and second handles are aligned laterally with each other when in said first position, said foot being above a horizontal plane of said bottom edge when said shaft and said pole are in said first position.

6. The pivotable shovel assembly according to claim 5, wherein said foot extends laterally away from said shaft.

7. A pivotable shovel assembly being comprising:
   a tool comprising:
      a shaft having a first end, a second end and a perimeter edge extending between said first end and said second end;
      a first handle being attached to and extending upwardly away from said first end;
      a head being attached to and extending downwardly away from said second end;

a pole having an upper end and a lower end, a foot being attached to said lower end;

a coupler being attached to and extending between said pole and said shaft such that said pole and said shaft are pivotable with respect to each other wherein upper halves of said pole and said shaft are positionable in a first position orientated parallel to each other and in a second position wherein said first handle is pivoted rearwardly with respect to said upper end; and wherein said coupler includes:

an axle extending between said pole and said shaft, said axle being spaced from each of said upper and lower ends;

a sleeve being positioned on said shaft, said shaft being rotatable within said sleeve, said axle being engaged with said sleeve.

8. A pivotable shovel assembly being comprising:

a tool comprising:

a shaft having a first end, a second end and a perimeter edge extending between said first end and said second end, wherein said perimeter edge has a front side and a rear side;

a first handle being attached to and extending upwardly away from said first end;

a head being attached to and extending downwardly away from said second end, wherein said head comprises a blade including a front face, a rear face and a bottom edge, said front face facing a same direction as said front side of said shaft;

a pole having an upper end and a lower end, a foot being attached to said lower end;

a coupler being attached to and extending between said pole and said shaft such that said pole and said shaft are pivotable with respect to each other wherein upper halves of said pole and said shaft are positionable in a first position orientated parallel to each other and in a second position wherein said first handle is pivoted rearwardly with respect to said upper end; and wherein a stop is attached to said shaft, said stop inhibiting pivoting of said shaft with respect to said pole when said stop abuts said pole, said stop abutting said pole when said shaft and pole are in said first position and said front face is directed forward.

9. A pivotable shovel assembly being comprising:

a tool comprising:

a shaft having a first end, a second end and a perimeter edge extending between said first end and said second end, said perimeter edge having a front side and a rear side;

a first handle being attached to and extending upwardly away from said first end;

a head being attached to and extending downwardly away from said second end, said head comprising a blade including a front face, a rear face and a bottom edge, said front face facing a same direction as said front side of said shaft;

a pole having an upper end and a lower end, a second handle being attached to said upper end, a foot being attached to said lower end, said pole having a bend therein positioned nearer said lower end than said upper end such that said pole is angled in a forward direction from said bend to said lower end;

a coupler being attached to and extending between said pole and said shaft such that said pole and said shaft are pivotable with respect to each other wherein upper halves of said pole and said shaft are positionable in a first position orientated parallel to each other and in a second position wherein said first handle is pivoted rearwardly with respect to said second handle, said first and second handles being aligned laterally with each other when in said first position, said foot being above a horizontal plane of said bottom edge when said shaft and said pole are in said first position, said foot extending laterally away from said shaft, said coupler including:

an axle extending between said pole and said shaft, said axle being spaced from each of said upper and lower ends;

a sleeve being positioned on said shaft, said shaft being rotatable within said sleeve, said axle being engaged with said sleeve;

a stop being attached to said shaft, said stop inhibiting rotation of said shaft with respect to said pole when said stop abuts said pole, said stop abutting said pole when said shaft and pole are in said first position and said front face is directed forward.

* * * * *